(12) United States Patent
Luo et al.

(10) Patent No.: US 10,038,991 B2
(45) Date of Patent: Jul. 31, 2018

(54) INFORMATION REPORTING METHOD, EQUIPMENT AND STORAGE MEDIUM

(71) Applicant: ZTE Corporation, Shenzhen, Guangdong (CN)

(72) Inventors: Yumin Luo, Shenzhen (CN); Yin Gao, Shenzhen (CN); Lin Chen, Shenzhen (CN); Ying Huang, Shenzhen (CN); Shuyu Ma, Shenzhen (CN); Dapeng Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/502,327

(22) PCT Filed: Apr. 30, 2015

(86) PCT No.: PCT/CN2015/077992
§ 371 (c)(1),
(2) Date: Feb. 7, 2017

(87) PCT Pub. No.: WO2016/019743
PCT Pub. Date: Feb. 11, 2016

(65) Prior Publication Data
US 2017/0230781 A1 Aug. 10, 2017

(30) Foreign Application Priority Data
Aug. 8, 2014 (CN) .......................... 2014 1 0390954

(51) Int. Cl.
*H04W 24/00* (2009.01)
*H04W 4/70* (2018.01)
(Continued)

(52) U.S. Cl.
CPC ............. *H04W 4/70* (2018.02); *H04W 4/005* (2013.01); *H04W 88/08* (2013.01); *H04W 92/18* (2013.01);
(Continued)

(58) Field of Classification Search
CPC ....... H04W 4/00; H04W 92/18; H04W 88/08; H04W 76/046; H04W 76/043; H04W 76/023
(Continued)

(56) References Cited

U.S. PATENT DOCUMENTS

| 2014/0078952 | A1* | 3/2014 | Bontu | H04W 76/023 370/312 |
|---|---|---|---|---|
| 2016/0302251 | A1* | 10/2016 | Chatterjee | H04W 8/005 |
| 2017/0150480 | A1* | 5/2017 | Kim | H04W 72/02 |

FOREIGN PATENT DOCUMENTS

| CN | 103002578 A | 3/2013 |
|---|---|---|
| CN | 103229582 A | 7/2013 |

(Continued)

OTHER PUBLICATIONS

International Search Report in international application No. PCT/CN2015/077992, dated Aug. 5, 2015, 2 pgs.
(Continued)

*Primary Examiner* — Amancio Gonzalez
(74) *Attorney, Agent, or Firm* — Cooper Legal Group, LLC

(57) ABSTRACT

An information reporting method is disclosed. A User Equipment (UE) receives configuration information for a Device to Device (D2D) resource acquisition failure, the configuration information for the D2D resource acquisition failure being used for a D2D UE with a drive test capability to collect information on the D2D resource acquisition failure in case of the D2D resource acquisition failure, and
(Continued)

send the information on the D2D resource acquisition failure. Another information reporting method, an evolved Node B, a UE and a storage medium are also disclosed.

19 Claims, 4 Drawing Sheets

(51) Int. Cl.
*H04W 4/00* (2018.01)
*H04W 88/08* (2009.01)
*H04W 92/18* (2009.01)
*H04W 76/02* (2009.01)
*H04W 76/04* (2009.01)
*H04W 76/23* (2018.01)
*H04W 76/14* (2018.01)
*H04W 76/27* (2018.01)

(52) U.S. Cl.
CPC ........ *H04W 76/023* (2013.01); *H04W 76/043* (2013.01); *H04W 76/046* (2013.01); *H04W 76/14* (2018.02); *H04W 76/23* (2018.02); *H04W 76/27* (2018.02)

(58) Field of Classification Search
USPC ........................................................ 455/425
See application file for complete search history.

(56) References Cited

FOREIGN PATENT DOCUMENTS

| CN | 103796317 A | 5/2014 |
| JP | 2016501480 A | 1/2016 |
| WO | 2013097144 A1 | 7/2013 |
| WO | 2014077658 A1 | 5/2014 |

OTHER PUBLICATIONS

English Translation of the Written Opinion of the International Search Authority in international application No. PCT/CN2015/077992, dated Aug. 5, 2015, 5 pgs.

"Draft report of 3GPP TSG RAN WG3 meeting #73bis", 2011, Juha Korhonen, TSG-RAN Working Group 3 Meeting #74, San Francisco, USA, 94 pgs.

Supplementary European Search Report in European application No. 15828965.2, dated Jul. 27, 2017, 7 pgs.

Supplementary European Search Report in European application No. 15828965.2, dated Jan. 29, 2018, 12 pgs.

"Integrated Source Scheduling for In-Coverage D2D Communication to Support Mode 1 and Mode 2", Mar. 2014, Institute for Information Industry, 3GPP YTSG RAN WGI Meeting #76bis, R1-141499, Shenzhen, China, Retrieved from the Internet: URL:http://www.3gpp.org/ftp/Meetings_3GPP_SYNC/RAN1/Docs/, 6 pgs.

* cited by examiner

INFORMATION REPORTING METHOD, EQUIPMENT AND STORAGE MEDIUM

TECHNICAL FIELD

The present disclosure relates to a reporting technology for radio communication, and particularly to an information reporting method, equipment and a storage medium.

BACKGROUND

In the field of radio communication, with rapid development of an intelligent User Equipment (UE) and mobile Internet applications, requirements of people on data transmission rate, transmitted data volume, user experience and the like become increasingly higher. A conventional cellular network employing a base station as a centre of data transmission nodes has sufficient limitations in terms of support to high data rate and proximity service, and under such a requirement background, a Device to Device (D2D) technology representative of a new direction of future development of communication technologies emerges. Application of the D2D technology may reduce a burden of a cellular network, reduce battery power consumption of UE, increase a data rate, improve robustness of a network infrastructure and well meet the abovementioned requirements on a high-data rate service and proximity service.

The D2D technology includes generally a D2D discovery technology and a D2D communication technology, and the D2D discovery technology refers to a technology for deciding/determining proximity between two or more D2D UEs or deciding/determining that a first UE is in proximity of a second UE. Usually, the D2D UEs may discover each other by sending or receiving a discovery signal/information, and under the coverage of a cellular network, the network may assist the D2D UE in D2D discovery. The D2D communication technology refers to a technology capable of implementing communication of part or all of communication data between D2D UEs directly without via a network infrastructure.

Before the D2D discovery or the D2D communication, the D2D UE is required to first acquire a corresponding radio resource. Two resource allocation manners may be adopted for a D2D discovery resource and a D2D communication resource, the first resource allocation manner is contention-based resource acquisition, and the second resource allocation manner is allocation of a dedicated resource to UE by a base station eNodeB.

Specifically, the first resource allocation manner is usually that the eNodeB or a system pre-allocates a D2D resource pool and the D2D UE participating in the D2D discovery or the D2D communication monitors the resource pool and acquires a D2D sending resource in a contention manner; and the second resource allocation manner is that the eNodeB allocates a proper D2D resource to the D2D UE according to a request from the D2D UE.

During the D2D discovery or communication between UEs, D2D resource acquisition failure information of a Minimization of Drive Test (MDT) enabled D2D UE is collected to assist in analyzing and regulating a D2D resource on a network side, so as to improve experiences of a D2D service of a network or provide a data model of the D2D service in the network for an operator. However, there is yet no solution for collecting the D2D resource acquisition failure information of the MDT enabled D2D UE and sending it to the network side using an MDT mechanism during the D2D discovery or communication in an existing art.

SUMMARY

In view of this, some embodiments of the disclosure are desired to provide an information reporting method, equipment and a storage medium to enable an eNodeB to process a D2D resource according to D2D resource acquisition failure information sent by the D2D UE, thereby improving a capability of a network side in monitoring and managing a D2D service and user experiences of the D2D service.

The technical solutions of embodiments of the present disclosure are implemented as follows.

An embodiment of the present disclosure provides an information reporting method including: receiving by a UE configuration information for a D2D resource acquisition failure; and upon determining the D2D resource acquisition failure, collecting information on the D2D resource acquisition failure according to the configuration information for the D2D resource acquisition failure, and sending the information on the D2D resource acquisition failure, wherein the information on the D2D resource acquisition failure is used for processing a D2D resource by an evolved Node B.

In the above solution, in a case where the information on the D2D resource acquisition failure is collected in a first resource allocation manner, the information on the D2D resource acquisition failure includes, but is not limited to, at least one of: a contention failure reason, a contention failure instant, information on a registered Public Land Mobile Network (PLMN) or a serving PLMN or a list of PLMNs of a D2D UE, a type of a discovery or communication resource, surrounding radio network environment information, position information, current residing cell or serving cell information or home cell information of a contention resource, information on a resource pool for which the D2D UE contends, resource pool load information measured last time after a contention failure of the D2D UE, contention failure instant information, an Identifier (ID) of a D2D communication group to which the UE belongs at a contention failure instant of a communication resource, and resource contention related information, and the resource contention related information includes contention failure times, total request times, retransmission times and delay from data packet transmission initiated by the D2D UE to successful delivery;

in a case where the information on the D2D resource acquisition failure is collected in a second resource allocation manner, the information on the D2D resource acquisition failure as acquired includes, but is not limited to, at least one of: a type of a discovery or communication resource for which the D2D UE requests, time for requesting for a resource by the D2D UE, information on a serving PLMN or a list of PLMNs of the D2D UE at a failure instant, the surrounding radio network environment information, the position information, current serving cell information or home cell information of the resource requested, relevant information on the resource requested upon request for the discovery or communication resource, a reason for a resource requesting failure returned by the evolved Node B, relevant parameters of the D2D UE in case of a failure, and resource requesting failure times; and the first resource allocation manner is a contention-based D2D resource acquisition manner; and the second resource allocation manner is an acquisition manner that the D2D UE requests the evolved Node B for the D2D resource and the evolved Node B allocates a dedicated D2D resource to the D2D UE.

In the above solution, the UE receives the configuration information for the D2D resource acquisition failure, which is sent by the evolved Node B through a dedicated message or a broadcast message.

In the above solution, the sending the information on the D2D resource acquisition failure includes: sending by the UE the collected information on the D2D resource acquisition failure to the evolved Node B through a dedicated message according to the configuration information for the D2D resource acquisition failure, in case of the D2D resource acquisition failure.

In the above solution, the configuration information for the D2D resource acquisition failure includes: a reporting manner for the information on the D2D resource acquisition failure, and an indication of the information on the D2D resource acquisition failure of the D2D UE during a D2D discovery and/or D2D communication, and the reporting manner for the information on the D2D resource acquisition failure includes an immediate reporting manner and a logged reporting manner.

In the above solution, the sending the information on the D2D resource acquisition failure includes:

when the reporting manner for the information on the D2D resource acquisition failure is configured as the immediate reporting manner, immediately sending by the UE the collected information on the D2D resource acquisition failure to the evolved Node B according to the configuration information for the D2D resource acquisition failure; or when the reporting manner for the information on the D2D resource acquisition failure is configured as the logged reporting manner, storing by the UE the information on the D2D resource acquisition failure, and sending the collected information on the D2D resource acquisition failure to the evolved Node B at a time of the D2D UE being in a connected state and/or according to the requirement of the configuration information for the D2D resource acquisition failure.

In the above solution, the configuration information for the D2D resource acquisition failure in the immediate reporting manner includes an application range, a reporting triggering event, a reporting interval and a reporting number; and/or the configuration information for the D2D resource acquisition failure in the logged reporting manner includes an application range, a log recording interval and a log configuration duration.

In the above solution, before the D2D resource acquisition failure is determined, the method further includes: when the UE fails to receive the configuration information for the D2D resource acquisition failure, collecting by the UE unattained configuration information for the D2D resource acquisition failure, and sending the unattained configuration information for the D2D resource acquisition failure to the evolved Node B.

An embodiment of the present disclosure further provides another information reporting method including: sending by an evolved Node B configuration information for a Device to Device (D2D) resource acquisition failure, the configuration information for the D2D resource acquisition failure being used for a D2D User Equipment (UE) with a drive test capability to collect information on the D2D resource acquisition failure in case of the D2D resource acquisition failure; and receiving the information on the D2D resource acquisition failure.

In the above solution, before sending by the evolved Node B the configuration information for the D2D resource acquisition failure, the method further includes: receiving by the evolved Node B the configuration information for the D2D resource acquisition failure sent by a Mobile Management Entity (MME) or a network management system.

In the above solution, before sending by the evolved Node B the configuration information for the D2D resource acquisition failure, the method further includes:

determining by the evolved Node B the D2D UE with the drive test capability; and correspondingly, the sending by the evolved Node B the configuration information for the D2D resource acquisition failure includes: sending by the evolved Node B the configuration information for the D2D resource acquisition failure to the determined D2D UE with the drive test capability through a dedicated message or a broadcast message.

In the above solution, the receiving by the evolved Node B the information on the D2D resource acquisition failure includes: receiving by the evolved Node B the information on the D2D resource acquisition failure, which is sent by the D2D UE through a dedicated message.

In the above solution, after receiving by the evolved Node B the information on the D2D resource acquisition failure, the method further includes: performing by the evolved Node B local processing on a D2D resource according to the information on the D2D resource acquisition failure as acquired; or sending the information on the D2D resource acquisition failure to a D2D service management network element or a Trace Collection Entity (TCE).

In the above solution, in case of X2 handover of the UE, the evolved Node B is a source evolved Node B, the method further includes: sending by the source evolved Node B the configuration information for the D2D resource acquisition failure to a target evolved Node B; after handover completion, determining by the target evolved Node B a D2D UE capable of reporting the information on the D2D resource acquisition failure; and transmitting by the target evolved Node B the configuration information for the D2D resource acquisition failure to an air interface of the D2D UE, and transmission of the configuration information for the D2D resource acquisition failure by the source evolved Node B is applicable to X2 handover of configuration information reported immediately based on signalling, in an intra-PLMN or in an inter-PLMN satisfying validity for the configuration information.

In the above solution, in case of S1 handover of the UE, the evolved Node B is a source evolved Node B, the method further includes: performing handover from the source evolved Node B to the target evolved Node B, and after handover completion, determining by a target MME or network management system to send the configuration information for the D2D resource acquisition failure through the target evolved Node B.

In the above solution, the configuration information for the D2D resource acquisition failure includes: a reporting manner for the information on the D2D resource acquisition failure, and an indication of the information on the D2D resource acquisition failure of the D2D UE during a D2D discovery and/or D2D communication, and the reporting manner for the information on the D2D resource acquisition failure includes: an immediate reporting manner and a logged reporting manner.

In the above solution, the configuration information for the D2D resource acquisition failure in the immediate reporting manner includes an application range, a reporting triggering event, a reporting interval and a reporting number; and/or the configuration information for the D2D resource acquisition failure in the logged reporting manner includes an application range, a log recording interval and a log configuration duration.

In the above solution, in a case where the information on the D2D resource acquisition failure is collected in a first resource allocation manner, the information on the D2D resource acquisition failure includes at least one of a contention failure reason, a contention failure instant, information on a registered Public Land Mobile Network (PLMN) or a serving PLMN or a list of PLMNs of a D2D UE, a type of a discovery or communication resource, surrounding radio network environment information, position information, current residing cell or serving cell information or home cell information of a contention resource, information on a resource pool for which the D2D UE contends, resource pool load information measured last time after a contention failure of the D2D UE, contention failure instant information, an Identifier (ID) of a D2D communication group to which the UE belongs at a contention failure instant of a communication resource, and resource contention related information; and in a case where the information on the D2D resource acquisition failure is collected in a second resource allocation manner, the information on the D2D resource acquisition failure includes at least one of a type of a discovery or communication resource for which the D2D UE requests, time for requesting for a resource by the D2D UE, information on a serving PLMN or a list of PLMNs of the D2D UE at a failure instant, the surrounding radio network environment information, the position information, current serving cell information or home cell information of the resource requested, relevant information on the resource requested upon request for the discovery or communication resource, a reason for a resource requesting failure returned by the evolved Node B, relevant parameters of the D2D UE in case of a failure, and resource requesting failure times.

In the above solution, before receiving the information on the D2D resource acquisition failure, the method further includes: receiving by the evolved Node B unattained configuration information for the D2D resource acquisition failure sent from the UE.

An embodiment of the present disclosure provides a User Equipment (UE) including a first receiving module, an acquisition module and a first sending module, the first receiving module is configured to receive configuration information for a Device to Device (D2D) resource acquisition failure;

the acquisition module is configured to acquire a D2D resource, and when the D2D resource acquisition failure is determined, collect information on the D2D resource acquisition failure and trigger the first sending module; and the first sending module is configured to send the information on the D2D resource acquisition failure, the information on the D2D resource acquisition failure being used to process the D2D resource by an evolved Node B.

In the above solution, the first receiving module is configured to receive the configuration information for the D2D resource acquisition failure, which is sent by the evolved Node B through a dedicated message or a broadcast message.

In the above solution, the first sending module is configured to send the information on the D2D resource acquisition failure to the evolved Node B through a dedicated message.

In the above solution, the first sending module is particularly configured to immediately send the information on the D2D resource acquisition failure to the evolved Node B according to the configuration information for the D2D resource acquisition failure; or store the collected information on the D2D resource acquisition failure, and send the collected information on the D2D resource acquisition failure to the evolved Node B at a time of the D2D UE being in a connected state, according to the configuration information for the D2D resource acquisition failure.

In the above solution, the first sending module is further configured to collect unattained configuration information for the D2D resource acquisition failure when the first receiving module fails to receive the configuration information for the D2D resource acquisition failure, and send the unattained configuration information for the D2D resource acquisition failure to the evolved Node B.

An embodiment of the present disclosure provides an evolved Node B including: a second sending module and a second receiving module, the second sending module is configured to send configuration information for a Device to Device (D2D) resource acquisition failure, and the configuration information for the D2D resource acquisition failure is used for a D2D User Equipment (UE) with a drive test capability to collect information on the D2D resource acquisition failure in case of the D2D resource acquisition failure; and the second receiving module is configured to receive the information on the D2D resource acquisition failure.

In the above solution, the second receiving module is further configured to receive the configuration information for the D2D resource acquisition failure sent by a Mobile Management Entity (MME) or a network management system, before the configuration information for the D2D resource acquisition failure is sent.

In the above solution, the evolved Node B further includes a determination module configured to determine the D2D UE with the drive test capability, correspondingly, the second sending module is configured to send the configuration information for the D2D resource acquisition failure to the D2D UE with the drive test capability through a dedicated message or a broadcast message.

In the above solution, the second receiving module is configured to receive the information on the D2D resource acquisition failure, which is sent by the D2D UE through a dedicated message.

In the above solution, the evolved Node B further includes a processing module configured to perform local processing on a D2D resource according to the information on the D2D resource acquisition failure, or send the information on the D2D resource acquisition failure as acquired to a D2D service management network element or a Trace Collection Entity (TCE).

In the above solution, in case of X2 handover of the UE, the second sending module is further configured to send the configuration information for the D2D resource acquisition failure to a target evolved Node B;

the determination module is further configured to determine a D2D UE capable of reporting the information on the D2D resource acquisition failure after handover completion; and correspondingly, the second sending module is further configured to transmit the configuration information for the D2D resource acquisition failure to an air interface of the D2D UE.

In the above solution, in case of S1 handover of the UE, the evolved Node B is a source evolved Node B, the processing module is further configured to perform handover to the target evolved Node B, and after handover completion, a target MME or network management system determines to send the configuration information for the D2D resource acquisition failure through the target evolved Node B.

In the above solution, the second receiving module is further configured to receive unattained configuration information for the D2D resource acquisition failure sent from the UE, before the information on the D2D resource acquisition failure is received.

An embodiment of the present disclosure further provides a computer storage medium in which a computer executable instruction is stored for executing the above information reporting methods.

According to the information reporting method, equipment and storage medium provided by the embodiments of the present disclosure, the eNodeB sends configuration information for the D2D resource acquisition failure to the D2D UE with the drive test capability; upon determining the D2D resource acquisition failure, the D2D UE sends the information on the D2D resource acquisition failure to the eNodeB according to the configuration information for the D2D resource acquisition failure after the D2D UE receives the configuration information for the D2D resource acquisition failure; the eNodeB receives the information on the D2D resource acquisition failure; and the D2D UE of the embodiment of the present disclosure is a D2D UE with the drive test capability. Therefore, the D2D UE may collect and send the information on the D2D resource acquisition failure to the eNodeB, the eNodeB may process the D2D resource according to the received information on the D2D resource acquisition failure. A capability of a network side in monitoring and managing a D2D service is improved, manual drive test work is reduced, and user experiences of the D2D service are improved.

DETAILED DESCRIPTION

In an embodiment of the present disclosure, an eNodeB sends configuration information for a D2D resource acquisition failure to a D2D UE with a drive test capability; when the D2D UE determines the D2D resource acquisition failure after receiving the configuration information for the D2D resource acquisition failure, the D2D UE sends information on the D2D resource acquisition failure collected to the eNodeB according to the configuration information for the D2D resource acquisition failure; the eNodeB receives the information on the D2D resource acquisition failure; and the D2D UE described in the embodiment of the present disclosure is a D2D UE with the drive test capability.

Figure 1:
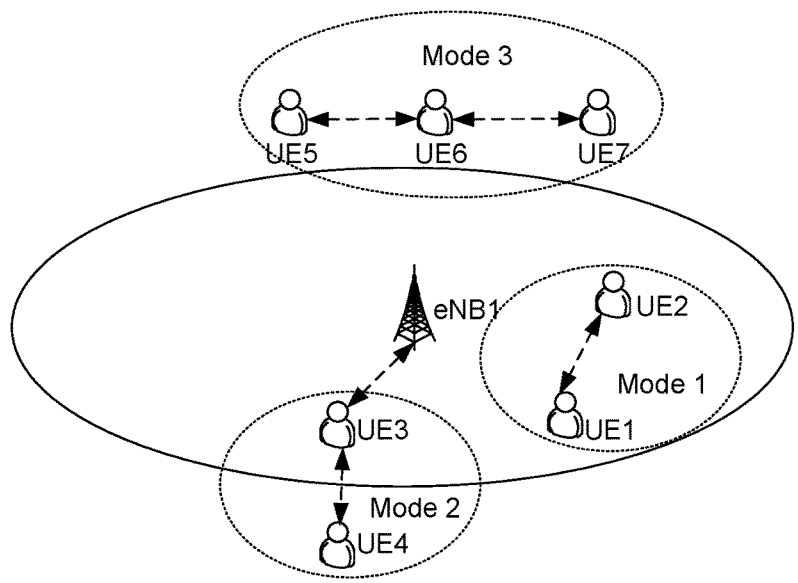
FIG. 1 is a schematic diagram of application modes of a D2D technology.

In order to understand better the technical solution described in the present embodiments, the knowledge related to a D2D technology and MDT will be introduced briefly below. The D2D technology may work in an authorized frequency band or an unauthorized frequency band, and allows direct discovery or direct communication of multiple UEs supporting for a D2D function, i.e. D2D UEs, with or without a network infrastructure. As shown in FIG. 1, there are mainly three types of D2D application modes of the D2D technology as follows:

1) mode 1 shown in FIG. 1: UE1 and UE2 perform data interaction under the coverage of a cellular network, and user plane data does not pass through a network infrastructure;

2) mode 2 shown in FIG. 1: a UE in a weakly-covered or uncovered area performs relay transmission, and UE4 with a poorer signal quality is allowed to communicate with the network through nearby UE3 covered by the network, which helps an operator to extend coverage and improve capacity; and 3) mode 3 shown in FIG. 1: direct communication is allowed among devices under the condition that the cellular network may not work normally in case of an earthquake or emergency, and in a control plane and a user plane among UE5, UE6 and UE7 one-hop or multi-hop data communication may be performed without via a network infrastructure.

In order to reduce cost and complexity in manual drive test performed by an operator using a specific equipment, the Third Generation Partnership Projects (3GPP) organization starts introducing an MDT function into Release-10 of Universal Terrestrial Radio Access Network (UTRAN) and Evolved Universal Terrestrial Radio Access Network (E-UTRAN) systems. An UTRAN includes a base station (Node B) and a Radio Network Controller (RNC), and its corresponding Core Network (CN) includes a Home Subscriber Server (HSS), a Mobile Switching Centre (MSC) server, a Serving General Packet Radio Service (GPRS) Support Node (SGSN), a GPRS and the like; and an E-UTRAN includes an evolved Node B (eNB), and its corresponding CN includes: an HSS, an MME and the like. The MDT function collects automatically measurement information by use of the UE, reports it to a Radio Access Network (RAN) through control plane signalling, and then reports it to a TCE of an Operation and Maintenance (OAM) system through the RAN. Applications of MDT mainly include aspects of coverage optimization, capacity optimization, mobility optimization, common channel parameter optimization and the like.

According to different MDT configuration manners, an existing MDT technology supports for management based MDT and signalling based MDT flows. Management based MDT is mainly for a UE within specific area coverage; signalling based MDT mainly performs a MDT configuration for a specific UE; and signalling based MDT usually specifies a certain UE by virtue of an International Mobile Subscriber Identity (IMSI) or an International Mobile Station Equipment Identity (IMEI), or limits selection of UE through addition of region information.

In the existing art, the MDT supports for MDT measurement by UE in a connected state and an idle state; according to different reporting manners for the UE, an existing MDT technology supports for immediate MDT and logged MDT manners; the immediate MDT manner refers to that the UE in the connected state performs MDT measurement according to MDT configuration information, reports measurement information to an RAN in time, and then reports it to a TCE through the RAN; and the logged MDT manner refers to that the UE in the idle state performs MDT measurement according to MDT configuration information and stores measurement information, and upon entering the connected state, the UE reports the measurement information to the RAN and then reports it to the TCE through the RAN.

The UE may be configured with two sets of independent configuration information, i.e. immediate MDT configuration information and logged MDT configuration information. The two kinds of MDT configuration information are both configured by a network side when the UE is in the connected state; and each of the immediate MDT configuration information and the logged MDT configuration information includes an MDT application range, mark information of the UE and an MDT measurement content, in this case the MDT application range may be represented by a cell list or a Tracking Area (TA) list; and the mark information of the UE is only used for UE-based tracking in a UMTS. According to a difference between an immediate reporting manner and a logged reporting manner, the immediate MDT configuration information further includes: a reporting triggering event, a reporting interval and a reporting number; and the logged MDT configuration information further includes: a log recording interval and a log configuration duration.

Figure 2:
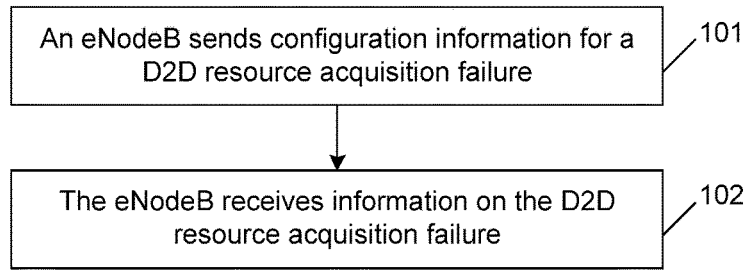
FIG. 2 is a schematic diagram of a basic processing flow of an information reporting method on an eNodeB side according to an embodiment of the present disclosure.

A basic processing flow of an information reporting method on an eNodeB side in the embodiment of the present disclosure, as shown in FIG. 2, includes the following steps.

At Step 101: an eNodeB sends configuration information for a D2D resource acquisition failure.

Specifically, the eNodeB receives the configuration information for the D2D resource acquisition failure sent from an MME or a network management system, then determines a D2D UE with a drive test capability, and finally sends the configuration information for the D2D resource acquisition failure to the D2D UE with the drive test capability through a special message or a broadcast message.

In an embodiment, in a process of reporting information on the D2D resource acquisition failure, in case of S1 handover of the D2D UE, a target MME or network management system determines whether to send the configuration information for the D2D resource acquisition failure through a target eNodeB or not.

In the process of reporting the information on the D2D resource acquisition failure, in case of X2 handover of the D2D UE, when a source eNodeB, which acquires the configuration information for the D2D resource acquisition failure from the MME or the network management system, sends a handover request message to the target eNodeB, the configuration information for the D2D resource acquisition failure is transmitted to the target eNodeB through an X2 interface information; and after the handover is completed, the target eNodeB determines the D2D UE with the drive test capability, and transmits the configuration information for the D2D resource acquisition failure to an air interface of the D2D UE with the drive test capability.

Here, transmission of the configuration information for the D2D resource acquisition failure among the eNodeB is applicable to X2 handover of configuration information for the D2D resource acquisition failure in the immediate reporting manner based on signalling, in an intra-PLMN or in an inter-PLMN satisfying validity for the configuration information.

The configuration information for the D2D resource acquisition failure includes: a reporting manner for the information on the D2D resource acquisition failure, and an indication of the information on the D2D resource acquisition failure of the D2D UE during a D2D discovery and/or D2D communication.

The reporting manner for the information on the D2D resource acquisition failure includes: an immediate reporting manner and a logged reporting manner. The immediate reporting manner is that the D2D UE immediately sends the information on the D2D resource acquisition failure to the eNodeB according to the configuration information for the D2D resource acquisition failure in the immediate reporting manner in case of the D2D resource acquisition failure; and the logged reporting manner is that the D2D UE stores and records the information on the D2D resource acquisition failure of the D2D UE in case of the D2D resource acquisition failure, and sends the recorded information on the D2D resource acquisition failure to the eNodeB at a proper time according to the requirement of the configuration information for the D2D resource acquisition failure in the logged reporting manner at a time of the D2D UE being in a connected state.

The configuration information for the D2D resource acquisition failure in the immediate reporting manner further includes an application range, a reporting triggering event, a reporting interval and a reporting number; and the configuration information for the D2D resource acquisition failure in the logged reporting manner further includes an application range, a log recording interval and a log configuration duration.

In an embodiment, when the D2D UE is within a network coverage and the UE is in the connected state, a network side configures that the D2D UE adopts the immediate reporting manner, and/or configures that the D2D UE adopts the logged reporting manner; when the D2D UE is within the network coverage and the D2D UE is in an idle state and/or the connected state, the network side configures that the logged reporting manner is adopted; and when the D2D UE is outside the network coverage, the network side configures that the D2D UE adopts the logged reporting manner.

At Step 102: the eNodeB receives information on the D2D resource acquisition failure.

Specifically, the eNodeB receives the collected information on the D2D resource acquisition failure sent by the D2D UE through a dedicated message.

The content of the information on the D2D resource acquisition failure is specified by the configuration information for the D2D resource acquisition failure.

In case of a D2D resource acquisition failure in a first resource allocation manner, the information on the D2D resource acquisition failure includes, but is not limited to, at least one of: a contention failure reason, a contention failure instant, information on a registered Public Land Mobile Network (PLMN) or a serving PLMN or a list of PLMNs of a D2D UE, a type of a discovery or communication resource, surrounding radio network environment information, position information, current residing cell or serving cell information or home cell information of a contention resource, information on a resource pool for which the D2D UE contends, resource pool load information measured last time after a contention failure of the D2D UE, contention failure instant information, an Identifier (ID) of a D2D communication group to which the UE belongs at a contention failure instant of a communication resource, and resource contention related information, in this case the resource contention related information includes contention failure times, total request times, retransmission times and delay from data packet transmission initiated by the D2D UE to successful delivery, and the like.

In case of a D2D resource acquisition failure in a second resource allocation manner, the information on the D2D resource acquisition failure as acquired includes, but is not limited to, at least one of: a type of a discovery or communication resource for which the D2D UE requests, time for requesting for a resource by the D2D UE, information on a serving PLMN or a list of PLMNs of the D2D UE at a failure instant, the surrounding radio network environment information, the position information, current serving cell information or home cell information of the resource requested, relevant information on the resource requested upon request for the discovery or communication resource, a reason for a resource requesting failure returned by the evolved Node B, relevant parameters of the D2D UE in case of a failure, and resource requesting failure times.

After Step 102 is executed, the method further includes that:

the eNodeB performs local processing on a D2D resource according to the information on the D2D resource acquisition failure, or sends the information on the D2D resource acquisition failure to a D2D service management network element or a TCE.

Figure 3:
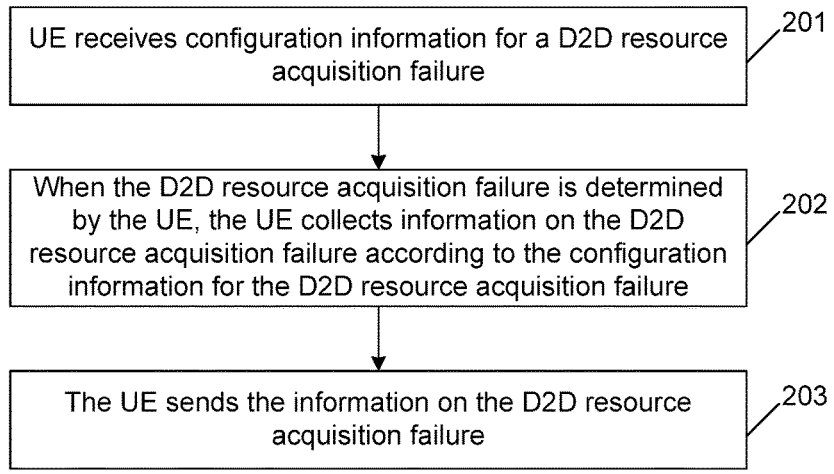
FIG. 3 is a schematic diagram of a basic processing flow of an information reporting method on a UE side according to an embodiment of the present disclosure.

A basic processing flow of an information reporting method on a UE side in the embodiment of the present disclosure, as shown in FIG. 3, includes the following steps.

At Step 201: the UE receives configuration information for a D2D resource acquisition failure.

Specifically, the UE receives the configuration information for the D2D resource acquisition failure which is sent by an eNodeB through a dedicated message or a broadcast message.

The configuration information for the D2D resource acquisition failure includes: a reporting manner for the information on the D2D resource acquisition failure, and an indication of the information on the D2D resource acquisition failure of the D2D UE during a D2D discovery and/or D2D communication.

The reporting manner for the information on the D2D resource acquisition failure includes: an immediate reporting manner and a logged reporting manner. The immediate reporting manner is configured for a UE in a connected state, and the logged reporting manner is configured for a UE in an idle state; reporting to a network through the eNodeB is triggered by a specified time or event; when the D2D UE is in a network coverage and the UE is in the idle state and/or the connected state, the logged reporting manner is configured to be adopted for reporting of the D2D resource acquisition failure;

and the logged reporting manner is configured for the D2D UE outside the network coverage.

The immediate reporting manner is that the D2D UE immediately sends the information on the D2D resource acquisition failure to the eNodeB according to the configuration information for the D2D resource acquisition failure in the immediate reporting manner in case of the D2D resource acquisition failure of the D2D UE; and the logged reporting manner is that the D2D UE stores and records the information on the D2D resource acquisition failure of the D2D UE in case of the D2D resource acquisition failure of the D2D UE, and triggers sending of the recorded information on the D2D resource acquisition failure to the eNodeB according to the specified time or event in the configuration information for the D2D resource acquisition failure in the logged reporting manner at a time of the D2D UE being in the connected state.

The configuration information for the D2D resource acquisition failure in the immediate reporting manner further includes an application range, a reporting triggering event, a reporting interval and a reporting number; and the configuration information for the D2D resource acquisition failure in the logged reporting manner further includes an application range, a log recording interval and a log configuration duration.

Here, before the D2D UE receives the configuration information for the D2D resource acquisition failure, the D2D UE first sends a D2D resource use request to the eNodeB, and when the eNodeB does not receive the D2D resource use request or the D2D UE does not receive a D2D resource using manner determined by the eNodeB, the D2D UE fails to acquire the configuration information for the D2D resource acquisition failure; and the D2D UE collects unattained configuration information for the D2D resource acquisition failure, and sends the unattained configuration information for the D2D resource acquisition failure to the eNodeB.

At Step 202: when the D2D resource acquisition failure is determined, the UE collects information on the D2D resource acquisition failure according to the configuration information for the D2D resource acquisition failure.

Specifically, upon determining the D2D resource acquisition failure, the UE collects the information on the D2D resource acquisition failure according to the configuration information for the D2D resource acquisition failure.

The information on the D2D resource acquisition failure of the D2D UE includes information on a D2D resource acquisition failure in a first resource allocation manner and/or information on a D2D resource acquisition failure in a second resource allocation manner.

Here, in case of a D2D resource acquisition failure in a first resource allocation manner, the information on the D2D resource acquisition failure includes, but is not limited to, at least one of: a contention failure reason, a contention failure instant, information on a registered Public Land Mobile Network (PLMN) or a serving PLMN or a list of PLMNs of a D2D UE, a type of a discovery or communication resource, surrounding radio network environment information, position information, current residing cell or serving cell information or home cell information of a contention resource, information on a resource pool for which the D2D UE contends, resource pool load information measured last time after a contention failure of the D2D UE, contention failure instant information, an Identifier (ID) of a D2D communication group to which the UE belongs at a contention failure instant of a communication resource, and resource contention related information, in this case the resource contention related information includes contention failure times, total request times, retransmission times and delay from data packet transmission initiated by the D2D UE to successful delivery, and the like.

In case of a D2D resource acquisition failure in a second resource allocation manner, the information on the D2D resource acquisition failure as acquired includes, but is not limited to, at least one of: a type of a discovery or communication resource for which the D2D UE requests, time for requesting for a resource by the D2D UE, information on a serving PLMN or a list of PLMNs of the D2D UE at a failure instant, the surrounding radio network environment information, the position information, current serving cell information or home cell information of the resource requested, relevant information on the resource requested upon request for the discovery or communication resource, a reason for a resource requesting failure returned by the evolved Node B, relevant parameters of the D2D UE in case of a failure, and resource requesting failure times.

In an embodiment, in case of S1 handover of the D2D UE, the D2D UE stops sending the acquired information on the D2D resource acquisition failure to the eNodeB; and after X2-interface-based handover of the D2D UE is completed, the D2D UE sends the collected information on the D2D resource acquisition failure to a target eNodeB.

At Step 203: the UE sends the information on the D2D resource acquisition failure.

Specifically, the UE sends the information on the D2D resource acquisition failure to the eNodeB through a dedicated message.

The UE of the embodiment of the present disclosure is a D2D UE with a drive test capability.

Embodiment 1

Figure 4:
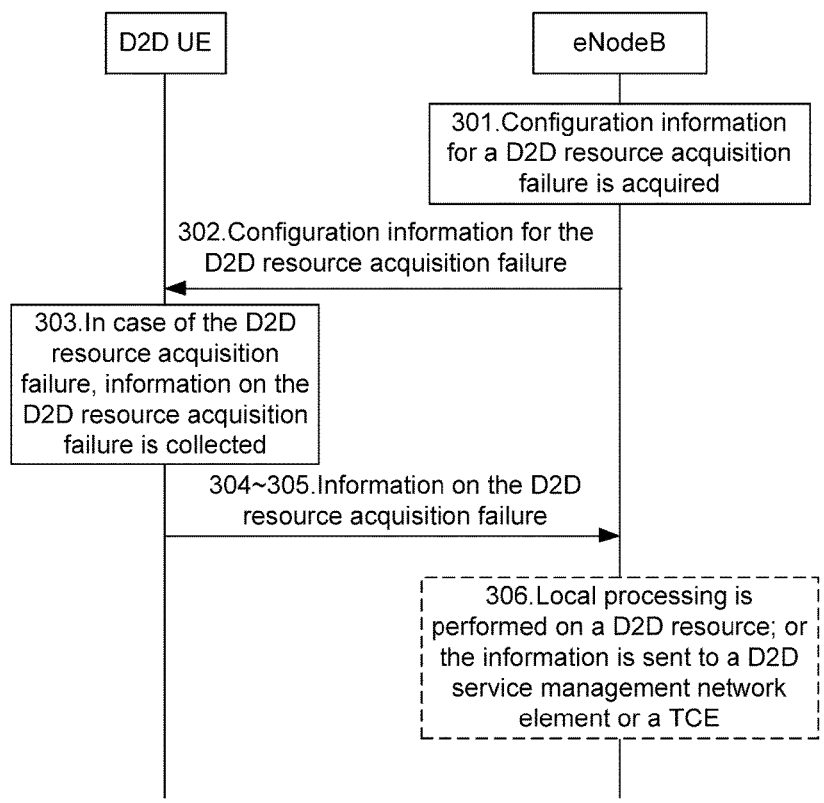
FIG. 4 is a schematic diagram of a detailed processing flow of an information reporting method according to Embodiment 1 of the present disclosure.

A detailed processing flow of an information reporting method in Embodiment 1 of the present disclosure, as shown in FIG. 4, includes the following steps.

At Step 301: an eNodeB acquires configuration information for a D2D resource acquisition failure.

Specifically, the eNodeB receives the configuration information for the D2D resource acquisition failure sent from an MME or a network management system.

The configuration information includes: a reporting manner for information on the D2D resource acquisition manner, and an indication of the information on the D2D resource acquisition failure of the D2D UE during a D2D discovery and/or D2D communication.

The reporting manner for the information on the D2D resource acquisition failure includes: an immediate reporting manner and a logged reporting manner. The immediate reporting manner is that the D2D UE immediately sends the information on the D2D resource acquisition failure to the eNodeB according to the configuration information for the D2D resource acquisition failure in the immediate reporting manner in case of the D2D resource acquisition failure of the D2D UE; and the logged reporting manner is that the D2D UE stores and records the information on the D2D resource acquisition failure of the D2D UE in case of the D2D resource acquisition failure of the D2D UE, and sends the recorded information on the D2D resource acquisition failure to the eNodeB according to the configuration information for the D2D resource acquisition failure in the logged reporting manner at a time of the D2D UE being in the connected state.

The configuration information for the D2D resource acquisition failure in the immediate reporting manner further includes an application range, a reporting triggering event, a reporting interval and a reporting number; and the configuration information for the D2D resource acquisition failure in the logged reporting manner further includes an application range, a log recording interval and a log configuration duration.

At Step 302: the eNodeB sends the configuration information for the D2D resource acquisition failure to the D2D UE.

Specifically, the eNodeB determines a MDT enabled D2D UE with a drive test capability, and then sends the configuration information for the D2D resource acquisition failure to the D2D UE with the drive test capability through a dedicated message or a broadcast message.

At Step 303: the D2D UE collects information on the D2D resource acquisition failure according to the configuration information for the D2D resource acquisition failure in case of the D2D resource acquisition failure of the D2D UE.

Specifically, the UE collects the information on the D2D resource acquisition failure according to the configuration information for the D2D resource acquisition failure upon determining the D2D resource acquisition failure.

During a D2D service of the D2D UE, for example, sending a discovery signal during a D2D discovery or sending data during D2D communication, it is necessary to acquire a D2D resource at first. A contention-based D2D resource acquisition manner is that: an eNodeB or a system pre-allocates a D2D resource pool, and the D2D UE participating in the D2D discovery or D2D communication monitors the resource pool, and acquires a D2D sending resource in a contention manner. The MDT enabled D2D UE collects the information on the D2D resource acquisition failure in case of the D2D resource acquisition failure in the contention manner, the information on the D2D resource acquisition failure includes at least one of: a contention failure reason, an authorization failure, resource control, resource insufficiency, a contention acquisition timeout, information on registered PLMN or serving PLMN or a list of PLMNs of the UE at a contention failure instant, a type of a discovery or communication resource, surrounding radio network environment information, position information, current residing cell or serving cell information or home cell information of a contention resource, information on a resource pool for which the UE contends, resource pool load information measured last time after a contention failure of the UE, contention failure instant information, an Identifier (ID) of a D2D communication group to which the UE belongs at a contention failure instant of a communication resource, and resource contention related information.

Here, the contention failure reason is valid only under the condition that the UE requests the eNodeB for a resource; the resource control is admission control over information such as priority of the UE;

the surrounding radio network environment information includes: signal quality information of serving cell and/or neighbour cell recorded by the UE at the failure instant;

the position information includes: an E-UTRAN Cell Global Identifier (ECGI), Global Positioning System (GPS) and the like of a current serving cell in case of the contention failure;

the contention failure instant information includes: a relative time length or an absolute timestamp of the UE; and the resource contention related information includes: contention failure times, total request times, retransmission times, delay from data packet transmission initiated by the UE to successful delivery and the like.

The D2D UE applies for the D2D resource to the eNodeB, and the eNodeB allocates a dedicated D2D resource to the D2D UE; and the D2D UE collects the information on the D2D resource acquisition failure in case of the D2D resource acquisition failure, and the information on the D2D resource acquisition failure includes at least one of: a type of resource for which the UE requests, time for requesting for a resource by the UE, current serving cell information or home cell information of the resource requested, information on a serving PLMN or a list of PLMNs of the D2D UE at a failure instant, the surrounding radio network environment information of the D2D UE at the failure instant, position information, relevant information on the discovery or communication resource requested, a reason for a resource requesting failure returned by the eNodeB, relevant parameters of the UE in case of a failure, and relevant information on resource requested.

Here, the type of resource for which the UE requests includes: a discovery resource or a communication resource;

the surrounding radio network environment information of the D2D UE at the failure instant includes for example signal quality information of serving cell and/or neighbour cell recorded by the UE at the failure instant;

the position information includes: a longitude, latitude, GPS and the like at the resource requesting failure instant;

the relevant parameter of the UE in case of the failure includes: transmitted power and the like of the UE; and the relevant information on the resource requested includes: repeated requesting failure times, total request times and the like.

At Step 304: the UE sends the information on the D2D resource acquisition failure.

Specifically, the terminal sends the information on the D2D resource acquisition failure to the eNodeB through a dedicated message according to a reporting manner specified in the configuration information for the D2D resource acquisition failure.

At Step 305: the eNodeB receives the information on the D2D resource acquisition failure.

Specifically, the eNodeB receives the information on the D2D resource acquisition failure sent from the D2D UE through the dedicated message.

At Step 306: the eNodeB performs local processing on a D2D resource according to the information on the D2D resource acquisition failure, or sends the information on the D2D resource acquisition failure to a D2D service management network element or a TCE.

Embodiment 2

Figure 5:
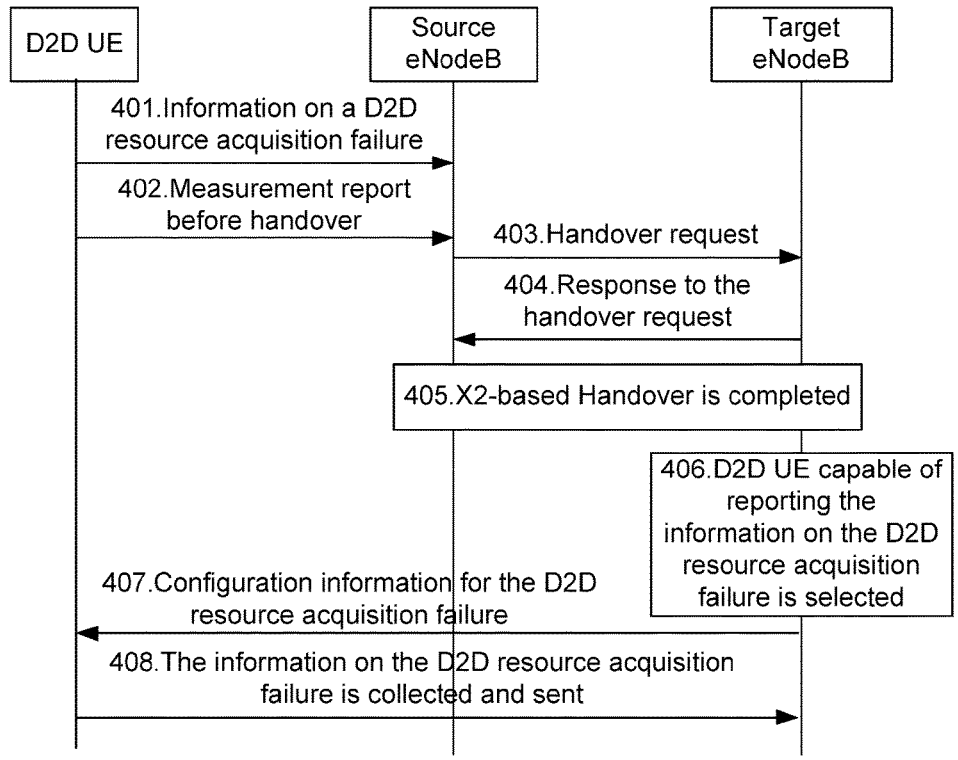
FIG. 5 is a schematic diagram of a detailed processing flow of an information reporting method according to Embodiment 2 of the present disclosure.

X2 handover occurs when D2D UE reports information on a D2D resource acquisition failure in an immediate reporting manner, and a detailed processing flow of an information reporting method in Embodiment 2 of the present disclosure, as shown in FIG. 5, includes the following steps.

At Step 401: a D2D UE sends the collected information on a D2D resource acquisition failure to a source eNodeB.

At Step 402: the D2D UE sends a measurement report before handover to the source eNodeB.

At Step 403: the source eNodeB sends a handover request to a target eNodeB after receiving the measurement report.

The handover request contains configuration information for the D2D resource acquisition failure; and the configuration information for the D2D resource acquisition failure includes: a reporting manner for the information on the D2D resource acquisition failure, an indication of the information on the D2D resource acquisition failure of the D2D UE during a D2D discovery and/or D2D communication, an application range, a reporting triggering event, a reporting interval and a reporting number.

Here, the reporting manner for the information on the D2D resource acquisition failure is an immediate reporting manner.

At Step 404: the target eNodeB sends a response to the handover request to the source eNodeB.

At Step 405: the target eNodeB and the source eNodeB implement X2-based handover.

At Step 406: the target eNodeB selects a D2D UE capable of reporting the information on the D2D resource acquisition failure.

Here, the D2D UE is a D2D UE with a drive test capability.

At Step 407: the target eNodeB sends the configuration information for the D2D resource acquisition failure to the selected D2D UE.

Here, the configuration information for the D2D resource acquisition failure is the same as the configuration information for the D2D resource acquisition failure in Step 403.

At Step 408: the D2D UE collects the information on the D2D resource acquisition failure according to the configuration information for the D2D resource acquisition failure in case of the D2D resource acquisition failure of the D2D UE, and sends the information on the D2D resource acquisition failure to the target eNodeB.

Specifically, the UE collects the information on the D2D resource acquisition failure according to the configuration information for the D2D resource acquisition failure in case of the D2D resource acquisition failure, and sends the information on the D2D resource acquisition failure to the eNodeB through a dedicated message according to the reporting manner specified in the configuration information for the D2D resource acquisition failure.

During a D2D service of the D2D UE, for example, sending a discovery signal during a D2D discovery or sending data during D2D communication, it is necessary to acquire a D2D resource at first. A contention-based D2D resource acquisition manner is that: an eNodeB or a system pre-allocates a D2D resource pool, and the D2D UE participating in the D2D discovery or D2D communication monitors the resource pool, and acquires a D2D sending resource in a contention manner. The MDT enabled D2D UE collects the information on the D2D resource acquisition failure in case of the D2D resource acquisition failure in the contention manner, the information on the D2D resource acquisition failure includes at least one of: a contention failure reason, an authorization failure, resource control, resource insufficiency, a contention acquisition timeout, information on registered PLMN or serving PLMN or a list of PLMNs of the UE at a contention failure instant, a type of a discovery or communication resource, surrounding radio network environment information, position information, current residing cell or serving cell information or home cell information of a contention resource, information on a resource pool for which the UE contends, resource pool load information measured last time after a contention failure of the UE, contention failure instant information, an Identifier (ID) of a D2D communication group to which the UE belongs at a contention failure instant of a communication resource, and resource contention related information.

Here, the contention failure reason is valid only under the condition that the UE requests the eNodeB for a resource; the resource control is admission control over information such as priority of the UE;

the surrounding radio network environment information includes: signal quality information of serving cell and/or neighbour cell recorded by the UE at the failure instant;

the position information includes ECGI, GPS and the like of a current serving cell in case of the contention failure;

the contention failure instant information includes: a relative time length or an absolute timestamp of the UE; and the resource contention related information includes: contention failure times, total request times, retransmission times, delay from data packet transmission initiated by the UE to successful delivery and the like.

The D2D UE applies for the D2D resource to the eNodeB, and the eNodeB allocates a dedicated D2D resource to the D2D UE; and the D2D UE collects the information on the D2D resource acquisition failure in case of the D2D resource acquisition failure, and the information on the D2D resource acquisition failure includes at least one of: a type of resource for which the UE requests, time for requesting for a resource by the UE, current serving cell information or home cell information of the resource requested, information on a serving PLMN or a list of PLMNs of the D2D UE at a failure instant, the surrounding radio network environment information of the D2D UE at the failure instant, position information, relevant information on the discovery or communication resource requested, a reason for a resource requesting failure returned by the eNodeB, relevant parameters of the UE in case of a failure, and relevant information on resource requested.

Here, the type of resource for which the UE requests includes: a discovery resource or a communication resource;

the surrounding radio network environment information of the D2D UE at the failure instant includes for example signal quality information of serving cell and/or neighbour cell recorded by the UE at the failure instant;

the position information includes: a longitude, latitude, GPS and the like at the resource requesting failure instant;

the relevant parameter of the UE in case of the failure includes: transmitted power and the like of the UE; and the relevant information on the resource requested includes: repeated requesting failure times, total request times and the like.

Figure 6:
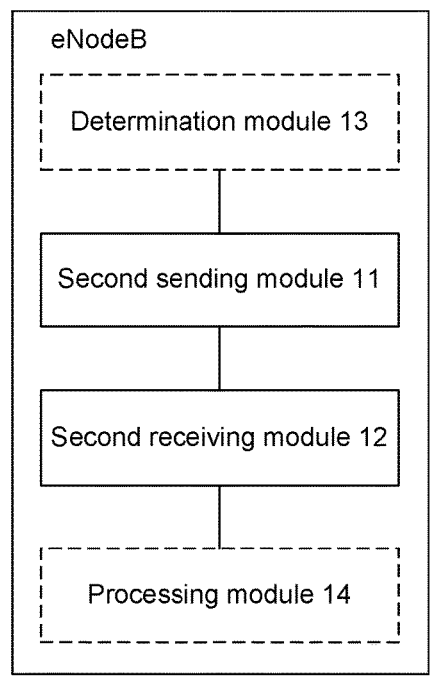
FIG. 6 is a schematic diagram of structure of an eNodeB according to an embodiment of the present disclosure.

In order to implement the abovementioned information reporting method, the embodiment of the present disclosure further provides an eNodeB, and a structure of the eNodeB, as shown in FIG. 6, includes a second sending module 11 and a second receiving module 12, the second sending module 11 is configured to send configuration information for a D2D resource acquisition failure, the configuration information for the D2D resource acquisition failure is used for a D2D UE with a drive test capability to collect information on the D2D resource acquisition failure in case of the D2D resource acquisition failure; and the second receiving module 12 is configured to receive the information on the D2D resource acquisition failure.

In an embodiment, the second receiving module 12 is further configured to receive the configuration information for the D2D resource acquisition failure from an MME or a network management system, before the configuration information for the D2D resource acquisition failure is sent.

In an embodiment, the eNodeB further includes a determination module 13 configured to determine a D2D UE with the drive test capability; and correspondingly, the second sending module 11 is specifically configured to send the configuration information for the D2D resource acquisition failure to the D2D UE with the drive test capability through a dedicated message or a broadcast message.

In an embodiment, the second receiving module 12 is specifically configured to receive the information on the D2D resource acquisition failure sent from the D2D UE through a dedicated message.

In an embodiment, the eNodeB further includes a processing module 14 configured to perform local processing on a D2D resource according to the information on the D2D resource acquisition failure, or send the acquired information on the D2D resource acquisition failure to a D2D service management network element or a TCE.

In case of X2 handover of the UE, the second sending module 11 is further configured to send the configuration information for the D2D resource acquisition failure to a target eNodeB;

the determination module 13 is further configured to determine a D2D UE capable of reporting the information on the D2D resource acquisition failure after handover completion; and correspondingly, the second sending module 11 is further configured to transmit the configuration information for the D2D resource acquisition failure to an air interface of the D2D UE.

In an embodiment, during S1 handover of the D2D UE, the eNodeB is a source eNodeB, the processing module 14 is further configured to perform handover from the source eNodeB to the target eNodeB, and after handover completion, determine by a target MME or network management system to send the configuration information for the D2D resource acquisition failure through the target eNodeB.

In case of X2 handover of the D2D UE, the source eNodeB which acquires the configuration information for the D2D resource acquisition failure from the MME or the network management system transmits the configuration information for the D2D resource acquisition failure to the target eNodeB through an X2 interface message when sending a handover request message to the target eNodeB; and after handover completion, the target eNodeB determines the D2D UE with the drive test capability, and transmits the configuration information for the D2D resource acquisition failure to an air interface of the D2D UE with the drive test capability.

Here, transmission of the configuration information for the D2D resource acquisition failure among the eNodeB is applicable to X2 handover of configuration information for the D2D resource acquisition failure in an immediate reporting manner based on signalling, in an intra-PLMN or in an inter-PLMN satisfying validity for the configuration information.

The configuration information for the D2D resource acquisition failure includes: a reporting manner for the information on the D2D resource acquisition failure, and an indication of the information on the D2D resource acquisition failure of the D2D UE during a D2D discovery and/or D2D communication.

The reporting manner for the information on the D2D resource acquisition failure includes: an immediate reporting manner and a logged reporting manner. The immediate reporting manner is that the D2D UE immediately sends the information on the D2D resource acquisition failure to the eNodeB according to the configuration information for the D2D resource acquisition failure in the immediate reporting manner in case of the D2D resource acquisition failure of the D2D UE; and the logged reporting manner is that the D2D UE stores and records the information on the D2D resource acquisition failure of the D2D UE in case of the D2D resource acquisition failure of the D2D UE, and sends the recorded information on the D2D resource acquisition failure to the eNodeB according to the configuration information for the D2D resource acquisition failure in the logged reporting manner at a time of the D2D UE being in the connected state.

The configuration information for the D2D resource acquisition failure in the immediate reporting manner further includes an application range, a reporting triggering event, a reporting interval and a reporting number; and/or the configuration information for the D2D resource acquisition failure in the logged reporting manner further includes an application range, a log recording interval and a log configuration duration.

When the D2D UE is within a network coverage and the UE is in the connected state, a network side configures that the D2D UE adopts the immediate reporting manner, and/or configures that the D2D UE adopts the logged reporting manner; when the D2D UE is within the network coverage and the D2D UE is in an idle state and/or the connected state, the network side configures that the logged reporting manner is adopted; and when the D2D UE is outside the network coverage, the network side configures that the D2D UE adopts the logged reporting manner.

Figure 7:
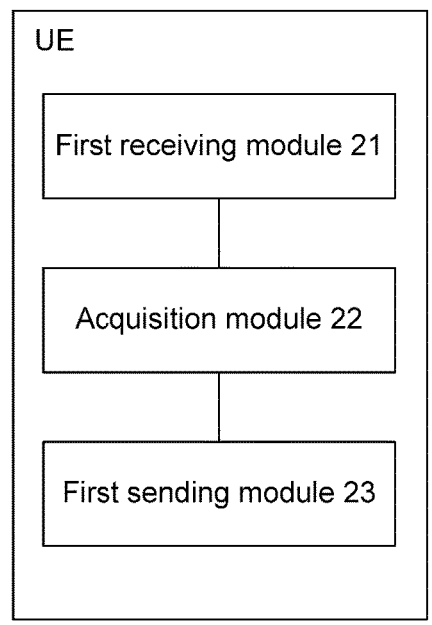
FIG. 7 is a schematic diagram of structure of a UE according to an embodiment of the present disclosure.

In order to implement the abovementioned information reporting method, the embodiment of the present disclosure further provides a UE, and a structure of the UE, as shown in FIG. 7, includes: a first receiving module 21, an acquisition module 22 and a first sending module 23, the first receiving module 21 is configured to receive configuration information for a D2D resource acquisition failure;

the acquisition module 22 is configured to acquire a D2D resource, and in case of the D2D resource acquisition failure, collect information on the D2D resource acquisition failure and trigger the first sending module; and the first sending module 23 is configured to send the information on the D2D resource acquisition failure, the information on the D2D resource acquisition failure is used for processing the D2D resource by an eNodeB.

The first receiving module 23 is further configured to collect unattained configuration information for the D2D resource acquisition failure when the first receiving module 21 fails to receive the configuration information for the D2D resource acquisition failure, and send the unattained configuration information for the D2D resource acquisition failure to the eNodeB.

In an embodiment, the first receiving module 21 is specifically configured to receive the configuration information for the D2D resource acquisition failure which is sent by the eNodeB through a dedicated message or a broadcast message.

In an embodiment, the first sending module 23 is specifically configured to send the information on the D2D resource acquisition failure to the eNodeB through a dedicated message.

The configuration information for the D2D resource acquisition failure includes: a reporting manner for the information on the D2D resource acquisition failure, and an indication of the information on the D2D resource acquisition failure of the D2D UE during a D2D discovery and/or D2D communication.

The reporting manner for the information on the D2D resource acquisition failure includes: an immediate reporting manner and a logged reporting manner. The immediate reporting manner is configured for a UE in a connected state, and the logged reporting manner is configured for a UE in an idle state; reporting to a network through the eNodeB is triggered by a specified time or event; when the D2D UE is within a network coverage and the UE is in the idle state and/or the connected state, the logged reporting manner is configured to be adopted for reporting of the D2D resource acquisition failure; and the logged reporting manner is configured for the D2D UE outside the network coverage.

The immediate reporting manner is that the D2D UE immediately sends the information on the D2D resource acquisition failure to the eNodeB according to the configuration information for the D2D resource acquisition failure in the immediate reporting manner in case of the D2D resource acquisition failure of the D2D UE; and the logged reporting manner is that the D2D UE stores and records the information on the D2D resource acquisition failure of the D2D UE in case of the D2D resource acquisition failure of the D2D UE, and triggers sending the recorded information on the D2D resource acquisition failure to the eNodeB according to the time or event specified in the configuration information for the D2D resource acquisition failure in the logged reporting manner at a time of the D2D UE being in the connected state.

The configuration information for the D2D resource acquisition failure in the immediate reporting manner further includes: an application range, a reporting triggering event, a reporting interval and a reporting number; and the configuration information for the D2D resource acquisition failure in the logged reporting manner further includes: an application range, a log recording interval and a log configuration duration.

In an embodiment, before the first receiving module 21 receives the configuration information for the D2D resource acquisition failure, the first sending module 23 sends a D2D resource use request to the eNodeB, and when the eNodeB does not receive the D2D resource use request or the D2D UE does not receive a D2D resource using manner determined by the eNodeB, the D2D UE fails to acquire the configuration information for the D2D resource acquisition failure; and the acquisition module collects unattained configuration information for the D2D resource acquisition failure, and the first sending module sends the unattained configuration information for the D2D resource acquisition failure to the eNodeB.

The information on the D2D resource acquisition failure of the D2D UE includes information on a failure in a first resource allocation manner, and/or information on a failure in a second resource allocation manner, the first resource allocation manner is a contention-based D2D resource acquisition manner, and the second resource allocation manner is that the D2D UE requests for the D2D resource to the eNodeB and the eNodeB allocates a dedicated D2D resource to the D2D UE.

Here, in case of a contention-based D2D resource acquisition failure, the information on the D2D resource acquisition failure includes at least one of a contention failure reason, a contention failure instant, information on a registered Public Land Mobile Network (PLMN) or a serving PLMN or a list of PLMNs of a D2D UE, a type of a discovery or communication resource, surrounding radio network environment information, position information, current residing cell or serving cell information or home cell information of a contention resource, information on a resource pool for which the D2D UE contends, resource pool load information measured last time after a contention failure of the D2D UE, contention failure instant information, an Identifier (ID) of a D2D communication group to which the UE belongs at a contention failure instant of a communication resource, and resource contention related information, the resource contention related information includes contention failure times, total request times, retransmission times and delay from data packet transmission initiated by the D2D UE to successful delivery, and the like.

In case of a failure of dedicated D2D resource allocated by the eNodeB to the D2D UE, the information on the D2D resource acquisition failure includes at least one of a type of a discovery or communication resource for which the D2D UE requests, time for requesting for a resource by the D2D UE, information on a serving PLMN or a list of PLMNs of the D2D UE at a failure instant, the surrounding radio network environment information, the position information, current serving cell information or home cell information of the resource requested, relevant information on the resource requested upon request for the discovery or communication resource, a reason for a resource requesting failure returned by the evolved Node B, relevant parameters of the D2D UE in case of a failure, and resource requesting failure times.

In an embodiment, in case of S1 handover of the D2D UE, the D2D UE stops sending the information on the D2D resource acquisition failure to the eNodeB; and after X2-interface-based handover of the D2D UE is completed, the D2D UE sends the collected information on the D2D resource acquisition failure to a target eNodeB.

The second sending module 11, the second receiving module 12, the determination module 13 and the processing module 14 mentioned in the embodiment of the present disclosure all may be implemented by a processor located in the eNodeB, and of course, may also be implemented by a specific logic circuit; the first receiving module 21, the acquisition module 22 and the first sending module 23 mentioned in the embodiment of the present disclosure all may be implemented by a processor located in the UE, and of course, may also be implemented by a specific logic circuit; and in a practical application, the processor may be a Central Processing Unit (CPU), a Micro Processing Unit (MPU), a Digital Signal Processor (DSP), a Field Programmable Gate Array (FPGA) or the like.

In an embodiment of the present disclosure, if being implemented in form of software function module and sold or used as an independent product, the abovementioned information reporting method may also be stored in a computer-readable storage medium. Based on such understanding, the technical solutions of the embodiments of the present disclosure in the nature or with the part making a contribution to the prior art can be embodied in the form of a software product; the computer software product is stored in a storage medium and includes a number of instructions to cause a computer device (which may be a personal computer, a server or a network device, etc.) perform all or part of the method in each of the embodiments of the present disclosure. The above-described storage medium includes a USB flash disk, a mobile hard disk, a Read Only Memory (called ROM), a magnetic disk or a compact disc, and various other media which can store program codes. In this way, the embodiment of the present disclosure is not limited to any particular combination of hardware and software.

Correspondingly, an embodiment of the present disclosure further provides a computer storage medium in which a computer program is stored for executing the above information reporting methods of the embodiments of the present disclosure.

What are described above are only the better embodiments of the present disclosure and are not intended to limit the scope of protection of the present disclosure.

What is claimed is:

1. An information reporting method comprising:
   receiving, by a User Equipment (UE), configuration information for a Device to Device (D2D) resource acquisition failure; and
   upon determining the D2D resource acquisition failure, collecting information on the D2D resource acquisition failure according to the configuration information for the D2D resource acquisition failure, and sending the information on the D2D resource acquisition failure, wherein the information on the D2D resource acquisition failure is used for processing a D2D resource by an evolved Node B;
   wherein the configuration information for the D2D resource acquisition failure comprises:
   a reporting manner for the information on the D2D resource acquisition failure and an indication of the information on the D2D resource acquisition failure of a D2D UE during at least one of D2D discovery or D2D communication, wherein the reporting manner for the information on the D2D resource acquisition failure comprises an immediate reporting manner and a logged reporting manner.

2. The information reporting method according to claim 1, wherein in a case where the information on the D2D resource acquisition failure is collected in a first resource allocation manner, the information on the D2D resource acquisition failure comprises, but is not limited to, at least one of: a contention failure reason, a contention failure instant, information on a registered Public Land Mobile Network (PLMN) or a serving PLMN or a list of PLMNs of the D2D UE, a type of a discovery or communication resource, surrounding radio network environment information, position information, current residing cell or serving cell information or home cell information of a contention resource, information on a resource pool for which the D2D UE contends, resource pool load information measured last time after a contention failure of the D2D UE, contention failure instant information, an Identifier (ID) of a D2D communication group to which the UE belongs at a contention failure instant of a communication resource, or resource contention related information, wherein the resource contention related information comprises contention failure times, total request times, retransmission times and delay from data packet transmission initiated by the D2D UE to successful delivery;
   in a case where the information on the D2D resource acquisition failure is collected in a second resource allocation manner, the information on the D2D resource acquisition failure comprises, but is not limited to, at least one of: a type of a discovery or communication resource for which the D2D UE requests, time for requesting for a resource by the D2D UE, information on a serving PLMN or a list of PLMNs of the D2D UE at a failure instant, the surrounding radio network environment information, the position information, current serving cell information or home cell information of the resource requested, relevant information on the resource requested upon request for the discovery or communication resource, a reason for a resource requesting failure returned by the evolved Node B, relevant parameters of the D2D UE in case of a failure, or resource requesting failure times; and
   the first resource allocation manner is a contention-based D2D resource acquisition manner; and the second resource allocation manner is an acquisition manner that the D2D UE requests the evolved Node B for the D2D resource and the evolved Node B allocates a dedicated D2D resource to the D2D UE.

3. The information reporting method according to claim 1, wherein the receiving, by the UE, the configuration information for the D2D resource acquisition failure comprises:
   receiving, by the UE, the configuration information for the D2D resource acquisition failure, which is sent by the evolved Node B through a dedicated message or a broadcast message.

4. The information reporting method according to claim 1, wherein the sending the information on the D2D resource acquisition failure comprises:
   sending, by the UE, the collected information on the D2D resource acquisition failure to the evolved Node B through a dedicated message according to the configuration information for the D2D resource acquisition failure, in case of the D2D resource acquisition failure.

5. The information reporting method according to claim 1, wherein the sending the information on the D2D resource acquisition failure comprises:
  when the reporting manner for the information on the D2D resource acquisition failure is configured as the immediate reporting manner, immediately sending, by the UE, the collected information on the D2D resource acquisition failure to the evolved Node B according to the configuration information for the D2D resource acquisition failure; or
  when the reporting manner for the information on the D2D resource acquisition failure is configured as the logged reporting manner, storing, by the UE, the information on the D2D resource acquisition failure, and sending the collected information on the D2D resource acquisition failure to the evolved Node B at a time of the D2D UE being in a connected state and according to a requirement of the configuration information for the D2D resource acquisition failure.

6. The information reporting method according to claim 1, wherein the configuration information for the D2D resource acquisition failure in the immediate reporting manner comprises an application range, a reporting triggering event, a reporting interval and a reporting number; or
  the configuration information for the D2D resource acquisition failure in the logged reporting manner comprises an application range, a log recording interval and a log configuration duration.

7. The information reporting method according to claim 1, wherein before the D2D resource acquisition failure is determined, the method further comprises:
  when the UE fails to receive the configuration information for the D2D resource acquisition failure, collecting, by the UE, unattained configuration information for the D2D resource acquisition failure, and sending the unattained configuration information for the D2D resource acquisition failure to the evolved Node B.

8. An information reporting method comprising:
  sending, by an evolved Node B, configuration information for a Device to Device (D2D) resource acquisition failure, the configuration information for the D2D resource acquisition failure being used for a D2D User Equipment (UE) with a drive test capability to collect information on the D2D resource acquisition failure in case of the D2D resource acquisition failure; and
  receiving the information on the D2D resource acquisition failure;
  wherein the configuration information for the D2D resource acquisition failure comprises:
    a reporting manner for the information on the D2D resource acquisition failure and an indication of the information on the D2D resource acquisition failure of the D2D UE during at least one of D2D discovery or D2D communication, wherein the reporting manner for the information on the D2D resource acquisition failure comprises an immediate reporting manner and a logged reporting manner.

9. The information reporting method according to claim 8, wherein before sending, by the evolved Node B, the configuration information for the D2D resource acquisition failure, the method further comprises: receiving, by the evolved Node B, the configuration information for the D2D resource acquisition failure sent by a Mobile Management Entity (MME) or a network management system.

10. The information reporting method according to claim 8, wherein before sending, by the evolved Node B, the configuration information for the D2D resource acquisition failure, the method further comprises:
  determining, by the evolved Node B, the D2D UE with the drive test capability; and
  correspondingly, the sending, by the evolved Node B, the configuration information for the D2D resource acquisition failure comprises:
    sending, by the evolved Node B, the configuration information for the D2D resource acquisition failure to the determined D2D UE with the drive test capability through a dedicated message or a broadcast message.

11. The information reporting method according to claim 8, wherein the receiving, by the evolved Node B, the information on the D2D resource acquisition failure comprises:
  receiving, by the evolved Node B, the information on the D2D resource acquisition failure, which is sent by the D2D UE through a dedicated message.

12. The information reporting method according to claim 8, wherein after receiving, by the evolved Node B, the information on the D2D resource acquisition failure, the method further comprises:
  performing, by the evolved Node B, local processing on a D2D resource according to the information on the D2D resource acquisition failure as acquired; or
  sending the information on the D2D resource acquisition failure to a D2D service management network element or a Trace Collection Entity (TCE).

13. The information reporting method according to claim 8, wherein in case of X2 handover of a UE, the evolved Node B is a source evolved Node B, the method further comprises:
  sending, by the source evolved Node B, the configuration information for the D2D resource acquisition failure to a target evolved Node B;
  after handover completion, determining, by the target evolved Node B, a D2D UE capable of reporting the information on the D2D resource acquisition failure; and
  transmitting, by the target evolved Node B, the configuration information for the D2D resource acquisition failure to an air interface of the D2D UE, wherein transmission of the configuration information for the D2D resource acquisition failure by the source evolved Node B is applicable to X2 handover of configuration information reported immediately based on signalling, in an intra-PLMN or in an inter-PLMN satisfying validity for the configuration information.

14. The information reporting method according to claim 8, wherein in case of S1 handover of a UE, the evolved Node B is a source evolved Node B, the method further comprises:
  performing handover from the source evolved Node B to a target evolved Node B, and after handover completion, determining by a target MME or network management system to send the configuration information for the D2D resource acquisition failure through the target evolved Node B.

15. The information reporting method according to claim 8, wherein the configuration information for the D2D resource acquisition failure in the immediate reporting manner comprises an application range, a reporting triggering event, a reporting interval and a reporting number; or
  the configuration information for the D2D resource acquisition failure in the logged reporting manner comprises an application range, a log recording interval and a log configuration duration.

16. The information reporting method according to claim 8, wherein in a case where the information on the D2D resource acquisition failure is collected in a first resource allocation manner, the information on the D2D resource acquisition failure comprises at least one of a contention failure reason, a contention failure instant, information on a registered Public Land Mobile Network (PLMN) or a serving PLMN or a list of PLMNs of the D2D UE, a type of a discovery or communication resource, surrounding radio network environment information, position information, current residing cell or serving cell information or home cell information of a contention resource, information on a resource pool for which the D2D UE contends, resource pool load information measured last time after a contention failure of the D2D UE, contention failure instant information, an Identifier (ID) of a D2D communication group to which a UE belongs at a contention failure instant of a communication resource, or resource contention related information; and in a case where the information on the D2D resource acquisition failure is collected in a second resource allocation manner, the information on the D2D resource acquisition failure comprises at least one of a type of a discovery or communication resource for which the D2D UE requests, time for requesting for a resource by the D2D UE, information on a serving PLMN or a list of PLMNs of the D2D UE at a failure instant, the surrounding radio network environment information, the position information, current serving cell information or home cell information of the resource requested, relevant information on the resource requested upon request for the discovery or communication resource, a reason for a resource requesting failure returned by the evolved Node B, relevant parameters of the D2D UE in case of a failure, or resource requesting failure times.

17. The information reporting method according to claim 8, wherein before receiving the information on the D2D resource acquisition failure, the method further comprises:
receiving, by the evolved Node B, unattained configuration information for the D2D resource acquisition failure sent from a UE.

18. A User Equipment (UE) comprising:
a processor; and
a memory for storing instructions executable by the processor;
wherein the processor is configured to:
receive configuration information for a Device to Device (D2D) resource acquisition failure; and
upon determining the D2D resource acquisition failure, collect information on the D2D resource acquisition failure according to the configuration information for the D2D resource acquisition failure, and send the information on the D2D resource acquisition failure, wherein the information on the D2D resource acquisition failure is used for processing a D2D resource by an evolved Node B;
wherein the configuration information for the D2D resource acquisition failure comprises:
a reporting manner for the information on the D2D resource acquisition failure and an indication of the information on the D2D resource acquisition failure of a D2D UE during at least one of D2D discovery or D2D communication, wherein the reporting manner for the information on the D2D resource acquisition failure comprises an immediate reporting manner and a logged reporting manner.

19. An evolved Node B comprising:
a processor; and
a memory for storing instructions executable by the processor;
wherein the processor is configured to:
send configuration information for a Device to Device (D2D) resource acquisition failure, the configuration information for the D2D resource acquisition failure being used for a D2D User Equipment (UE) with a drive test capability to collect information on the D2D resource acquisition failure in case of the D2D resource acquisition failure; and
receive the information on the D2D resource acquisition failure;
wherein the configuration information for the D2D resource acquisition failure comprises:
a reporting manner for the information on the D2D resource acquisition failure and an indication of the information on the D2D resource acquisition failure of the D2D UE during at least one of D2D discovery or D2D communication, wherein the reporting manner for the information on the D2D resource acquisition failure comprises an immediate reporting manner and a logged reporting manner.

* * * * *